US011295287B2

(12) United States Patent
Nagamori

(10) Patent No.: US 11,295,287 B2
(45) Date of Patent: Apr. 5, 2022

(54) INFORMATION PROCESSING APPARATUS AND INFORMATION PROCESSING METHOD

(71) Applicant: TOSHIBA TEC KABUSHIKI KAISHA, Tokyo (JP)

(72) Inventor: Shuhei Nagamori, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 84 days.

(21) Appl. No.: 16/893,897

(22) Filed: Jun. 5, 2020

(65) Prior Publication Data
US 2021/0042728 A1    Feb. 11, 2021

(30) Foreign Application Priority Data

Aug. 6, 2019    (JP) .............................. JP2019-144716

(51) Int. Cl.
*G06Q 20/20* (2012.01)
*B62B 3/14* (2006.01)

(52) U.S. Cl.
CPC ......... *G06Q 20/208* (2013.01); *B62B 3/1424* (2013.01); *G06Q 20/204* (2013.01)

(58) Field of Classification Search
CPC .................................................. G06Q 20/208

USPC .......................................................... 235/383
See application file for complete search history.

(56) References Cited

U.S. PATENT DOCUMENTS

2009/0017764 A1*  1/2009  Bonner ................ G06Q 20/208
                                                            455/66.1

FOREIGN PATENT DOCUMENTS

JP          H09-132146 A      5/1997

* cited by examiner

*Primary Examiner* — Rafferty D Kelly
(74) *Attorney, Agent, or Firm* — Kim & Stewart LLP

(57) ABSTRACT

An information processing apparatus for commodity registration includes a cart body, a weight sensor, a movement sensor, a code scanner, a display, and a control circuit. The control circuit is configured to detect change of a weight according to the weight sensor. Upon detecting the weight change, the control circuit determines whether the code scanner has read a commodity code within a predetermined time period before or after the weight change. If the code scanner has not read a commodity code within the predetermined time period, it is determined whether or not movement of the cart body, as detected by the movement sensor, satisfies a predetermined condition. If the movement satisfies the predetermined condition, the control circuit controls the display to display a registration alert screen.

20 Claims, 7 Drawing Sheets

FIG. 8A

EXAMPLE OF NON-REGISTRATION ALERT

COMMODITY NOT REGISTERED IS PUT INTO BASKET.
PLEASE TAKE OUT CORRECT COMMODITY AND SCAN BARCODE.

EXAMPLE OF NON-DEREGISTRATION ALERT

RETURN REGISTRATION IS FORGOTTEN.
PLEASE SCAN BARCODE OF COMMODITY TAKEN OUT.

[OK]

INFORMATION PROCESSING APPARATUS AND INFORMATION PROCESSING METHOD

CROSS-REFERENCE TO RELATED APPLICATION

This application is based upon and claims the benefit of priority from Japanese Patent Application No. 2019-144716, filed on Aug. 6, 2019, the entire contents of which are incorporated herein by reference.

FIELD

Example embodiments described herein relate generally to an information processing apparatus, an information processing method and a program. More particularly, the example embodiments relate to a shopping cart system and a method for performing commodity registration during use of a shopping cart.

BACKGROUND

In recent years, an information processing apparatus, such as a tablet terminal and a smartphone, has been used as a point of sale (POS) terminal for self-service registration in conjunction with the use of a shopping cart or a shopping basket while the user is moving about a store. In such an information processing apparatus, the correspondence between those items placed into and taken out from the shopping cart or basket and registration and de-registration (return registration) of the items is checked, and when there is mismatch, the user is notified of the mismatch and prompted to perform correction.

However, in the related art, the notification may be performed at an inappropriate timing, e.g., a too early such as when the user intends to, but has not yet, performed registration or deregistration of a commodity. Therefore, it is desirable to perform such a notification at more proper timing.

DESCRIPTION OF THE DRAWINGS

FIG. 8A is a diagram illustrating an example of an alert displayed in the non-registration alert processing.

FIG. 8B is a diagram illustrating an example of an alert displayed in the non-deregistration alert processing.

DETAILED DESCRIPTION

In general, according to an embodiment, a shopping cart system includes a cart body, a weight sensor, a movement sensor, a code scanner, a display, and a control circuit. The control circuit is configured to detect change of a weight as detected by the weight sensor. Upon detecting the change in the weight, the control circuit determines whether the code scanner has read a commodity code within a predetermined time period before or after the change in weight. Upon determining that the code scanner has not read a commodity code within the predetermined time period, the control circuit determines whether movement of the cart body, as detected by the movement sensor, satisfies a predetermined condition. Upon determining that the movement of the cart body satisfies the predetermined condition, the control circuit controls the display to display a registration alert screen.

Figure 1:
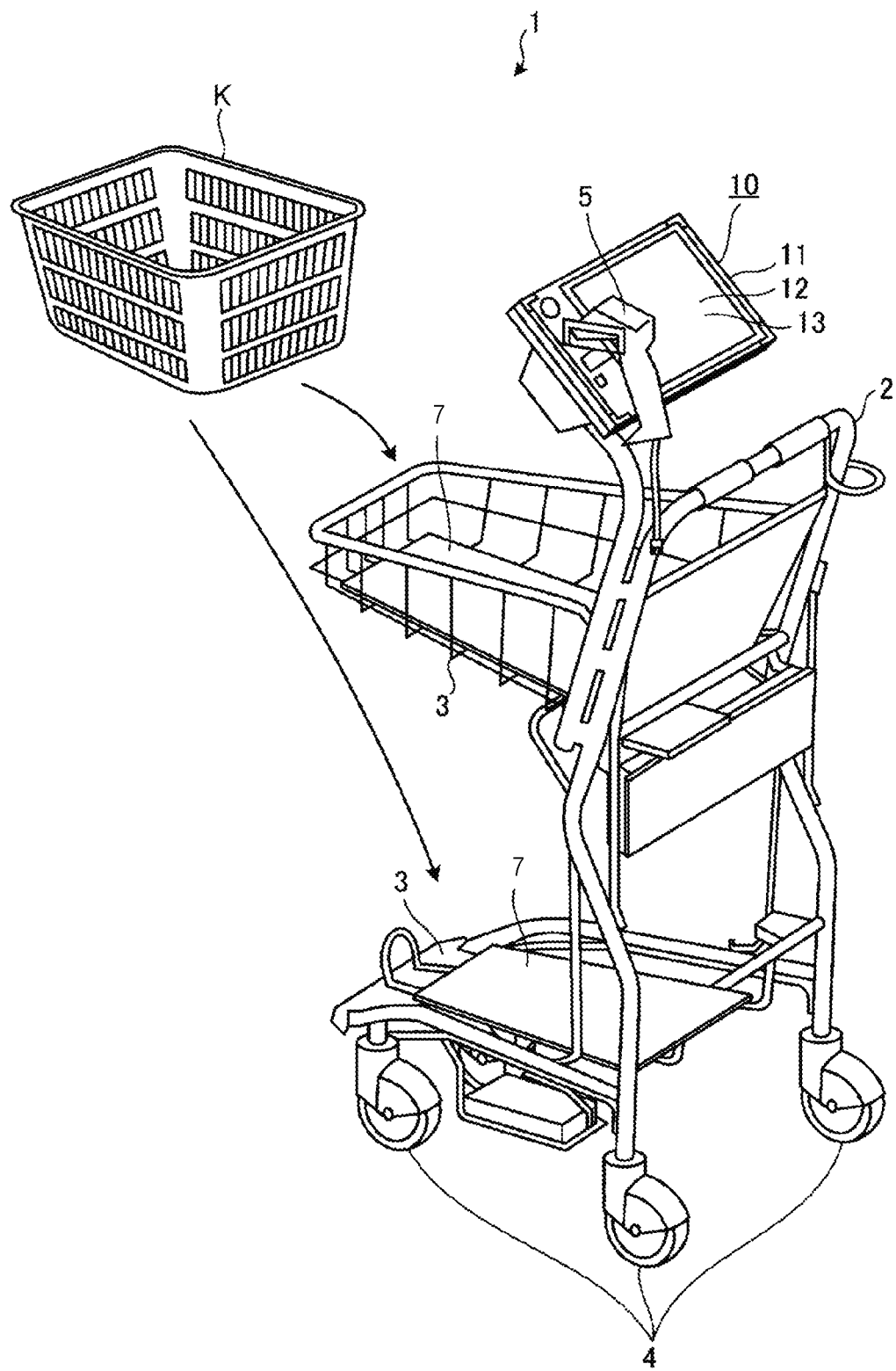
FIG. 1 illustrates a perspective view of a cart system according to an embodiment.

A non-limiting example embodiment will be described with reference to the drawings. FIG. 1 illustrates a perspective view of a cart system 1 of the embodiment. The cart system 1 is used in a retail store for carrying a commodity, and stores the commodity to be purchased while being moved in the store. The cart system 1 is moved in the store by pushing of a customer. The cart system 1 includes a cart body having a handle 2, a basket placing unit 3, caster wheels 4, and also includes a scanner 5 and a tablet POS 10.

The handle 2 is a portion of the cart body for the customer to handle and move the cart system 1. In this example, the basket placing unit 3 (which is an example of a commodity storage place) is a stand upon which a basket K for storing the commodity can be placed. In this example, a basket placing unit 3 is provided on upper and lower stages of the cart structure. The caster wheels 4 are provided on four legs of the cart system 1. The respective caster wheels 4 rotate individually, thereby making it possible for the cart system 1 to freely move in the store by being pushed by the customer.

The scanner 5 is an apparatus that reads a symbol (information for specifying the commodity) such as a barcode attached to the commodity. The scanner 5 is used to read the symbol on the commodity when the commodity is being purchased by the customer. The scanner 5 reads the symbol optically or by image capture. The scanner 5 transmits the decoded symbol to the tablet POS 10.

The tablet POS 10 is an example of an information processing apparatus according to an embodiment. The tablet POS 10 executes sales registration processing. The tablet POS 10 has the same general appearance and a function as those of a so-called tablet-type computer (tablet terminal), and includes a main body unit 11, a display unit 12, and an operation unit 13. The tablet POS 10 is attachable to the cart body of the cart system 1.

The display unit 12 is a plate-shaped display device such as a liquid crystal display. The operation unit 13 is a touch input device (e.g., a touch panel) superimposed on a surface of the display unit 12. The main body unit 11 is a thin box-shaped housing having an opening on one surface thereof, and stores the above-described units. The opening of the main body unit 11 exposes a region where the operation unit 13 receives an operation.

Figure 2:
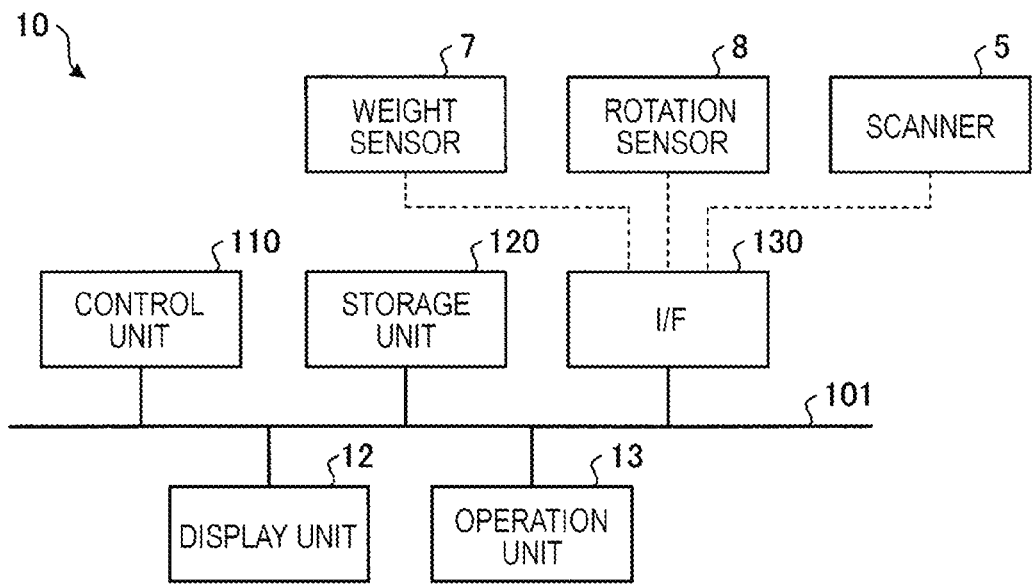
FIG. 2 is a block diagram schematically illustrating a configuration of a tablet POS.

FIG. 2 is a block diagram schematically illustrating a configuration of the tablet POS 10. The tablet POS 10 further includes a control unit 110, a storage unit 120, and an interface (I/F) 130, and the respective units are connected to each other via a system bus 101 such as a data bus and an address bus. The cart system 1 further includes a weight sensor 7 and a rotation sensor 8.

The weight sensor 7 is, for example, a plate-shaped apparatus as illustrated in FIG. 1, and is provided at the bottom of each of the upper and lower basket placing units 3. The weight sensor 7 includes, for example, a built-in load cell (or a plurality of pressure-sensitive sensors disposed side by side), and outputs a signal corresponding to a weight of the basket K and the commodity (or commodities) therein. The rotation sensor 8 is provided in the caster wheels 4, and outputs a signal corresponding to the rotation of at least one of the caster wheels 4. The rotation sensor 8 is an example of a movement sensor.

The I/F 130 receives the connection of the scanner 5, the weight sensor 7, and the rotation sensor 8, and enables communication between the scanner 5, the weight sensor 7, the rotation sensor 8, and the control unit 110.

The control unit 110 includes a central processing unit (CPU), a read only memory (ROM), and a random access memory (RAM). The ROM is a storage medium that stores various programs and data. The RAM is a storage medium that temporarily stores various programs and various types of data. The control unit 110 performs various functions and calculations when the CPU executes a program stored in the ROM or the storage unit 120, and integrally controls the operations of the tablet POS 10.

The storage unit 120 is a storage device such as a hard disk drive (HDD) or a solid state drive (SSD). The storage unit 120 stores various programs executable by the control unit 110 (CPU), and setting information.

The storage unit 120 stores a PLU file (also referred to as a commodity master file or a commodity master). The PLU file stores commodity codes uniquely assigned to each commodity and information about the corresponding commodity (this information will be referred to as commodity information) in association with each other. The commodity information includes, for example, a commodity title (commodity name), a price (unit price), a commodity classification, and a reference value for a weight of the commodity. Here, the reference value of the weight is set to have a predetermined range according to a characteristic of the commodity. For example, a reference value range may be set wider for natural products, such as fruits and vegetable than for that industrially manufactured commodities.

In the sales registration processing, the tablet POS 10 decodes the symbol as read by the scanner 5 to acquire a commodity code, reads out the commodity information relating to the commodity specified by the commodity code from the PLU file, displays the read-out commodity information on the display unit 12, and stores the commodity information in a commodity information storage unit (which may be a partial region of the storage unit 120).

Figure 3:
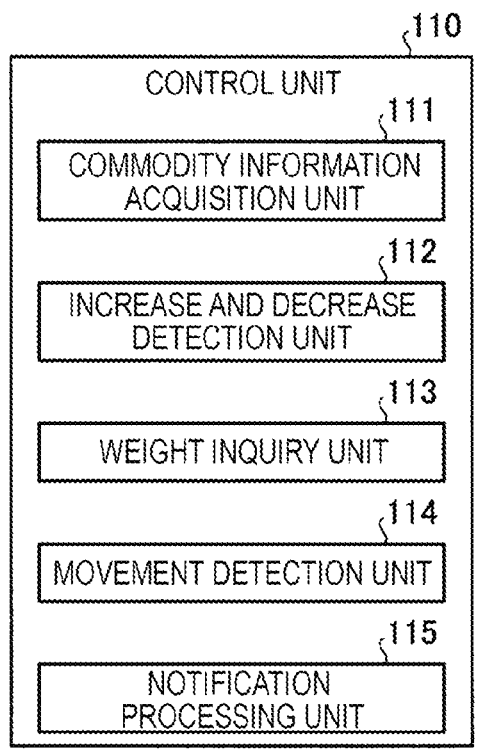
FIG. 3 is a block diagram illustrating a functional configuration of a control unit of the tablet POS.

FIG. 3 is a block diagram illustrating a functional configuration of the control unit 110 of the tablet POS 10. The control unit 110 includes a commodity information acquisition unit 111, an increase and decrease detection unit 112, a weight inquiry unit 113, a movement detection unit 114, and a notification processing unit 115. The control unit 110 performs each of the above-described functional units by executing the program stored in the ROM and/or the storage unit 120.

The commodity information acquisition unit 111 acquires the commodity information based upon information (commodity code) received from the scanner 5 via the I/F 130. That is, the commodity information acquisition unit 111 reads out the commodity information (commodity name, price, and reference value of weight) relating to the commodity specified by the commodity code from the PLU file.

The increase and decrease detection unit 112 detects whether the number of commodities held by a predetermined commodity placement portion (basket placing unit 3) increases or decreases. More specifically, the increase and decrease detection unit 112 outputs a signal corresponding to the increase and decrease in the number of commodities stored on or held by the basket placing unit 3 based upon the output of the weight sensor 7 received via the I/F 130, and for example, outputs a value corresponding to a weight held by the basket placing unit 3.

The weight inquiry unit 113 compares an increase and decrease value of the weight held by the basket placing unit based upon the output of the increase and decrease detection unit 112 to a reference value for the weight included in the commodity information acquired by the commodity information acquisition unit 111. When the increase and decrease value is very different from the reference value (for example, the increase and decrease value deviates from within a predetermined range set as the reference value), the weight inquiry unit 113 performs a notification that causes a user to be warned about possible commodity registration errors.

The movement detection unit 114 detects whether the commodity placement portion (basket placing unit 3) moves. More specifically, the movement detection unit 114 outputs a signal corresponding to a movement state of the basket placing unit 3 based upon the output of the rotation sensor 8 received via the I/F 130. In the embodiment, this signal can calculate a movement distance.

In spite of a fact that the output of the increase and decrease detection unit 112 indicates the increase and decrease in the number of commodities, when the commodity information acquisition unit 111 does not acquire the commodity information and the output of the movement detection unit 114 indicates that the basket placing unit 3 moves, the notification processing unit 115 notifies information (alert) that causes the user to be warned about the commodity registration and possible errors or discrepancies thereof. As a specific example of the alert, there are a warning to perform the commodity registration when the output of the increase and decrease detection unit 112 indicates an increase in the number of commodities and similarly a warning to perform the deregistration (return) of a commodity when the output of the increase and decrease detection unit 112 indicates a decrease in the number of commodities. When it is determined that the movement distance of the basket placing unit 3 reaches a predetermined value based upon the output of the movement detection unit 114, the notification processing unit 115 performs the above-described alert notification.

Figure 4:
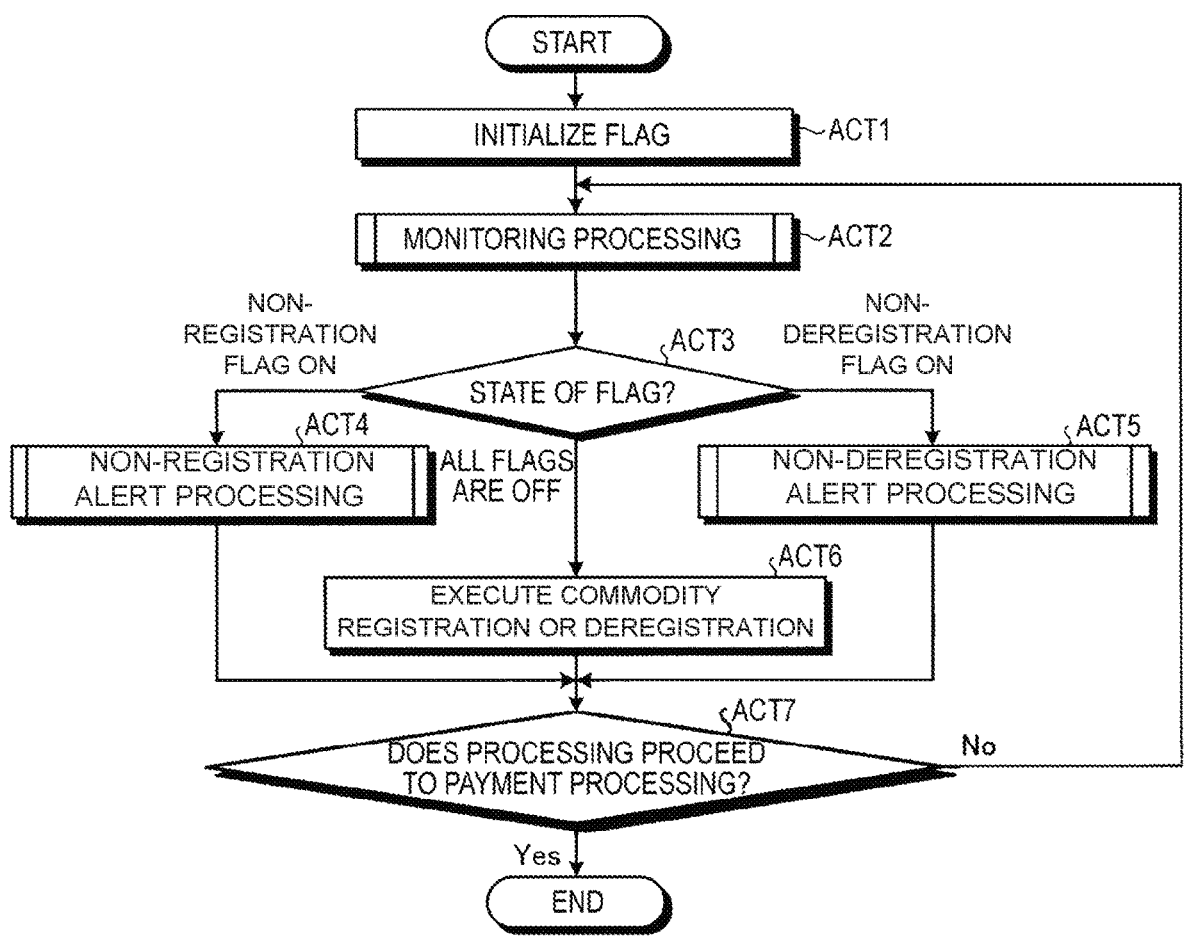
FIG. 4 is a flowchart schematically illustrating a flow of processing performed by the tablet POS.

The processing performed by the tablet POS 10 having the above-described configuration will be hereinafter described. FIG. 4 is a flowchart schematically illustrating a flow of the processing performed by the tablet POS 10. The control unit 110 first initializes a "non-registration flag" and a "non-deregistration flag" (ACT 1). Here, an initial state of the flags is OFF.

Next, the control unit 110 performs monitoring processing (described below, refer to FIG. 5) (ACT 2), and selects the next processing according to a state of the flag of the result of the processing (non-deregistration flag and non-deregistration flag) (ACT 3).

When the non-registration flag is ON in ACT 3, the control unit 110 performs non-registration alert processing (described below, refer to FIG. 6) (ACT 4). When the non-deregistration flag is ON in ACT 3, the control unit 110 performs non-deregistration alert processing (described below, refer to FIG. 7) (ACT 5). When all the flags are OFF in ACT 3, the control unit 110 executes commodity registration or commodity deregistration (ACT 6).

Next, after ACTS 4, 5, and 6, the control unit 110 determines whether to proceed to payment processing (ACT 7). When it is determined in ACT 7 that the process proceeds to the payment processing (Yes in ACT 7), the control unit 110 terminates the monitoring processing. When it is determined in ACT 7 that the process does not proceed to the payment processing (No in ACT 7), the process returns ACT 2.

Figure 5:
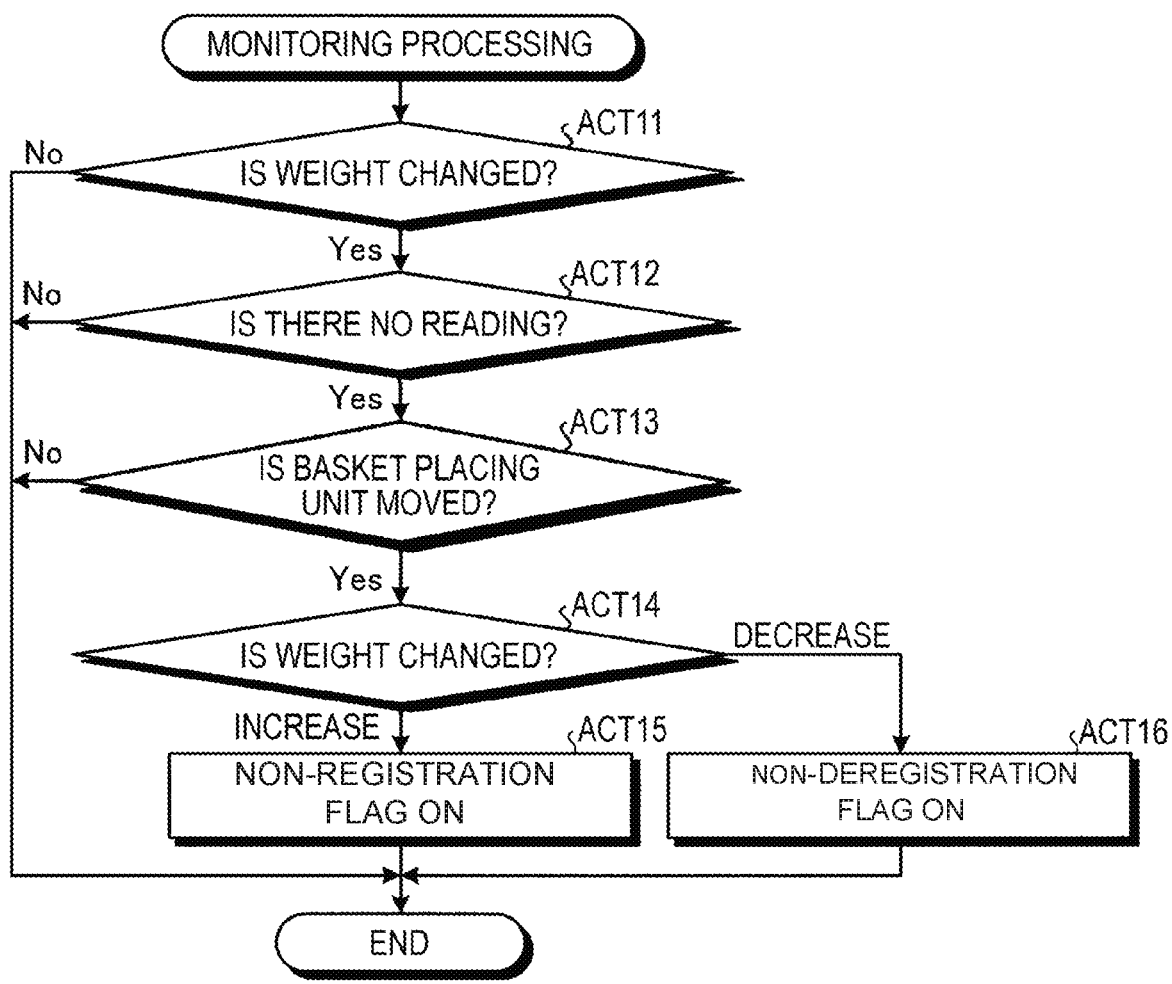
FIG. 5 is a flowchart schematically illustrating a flow of monitoring processing.

FIG. 5 is a flowchart schematically illustrating a flow of the monitoring processing (ACT 2). In the monitoring processing, the control unit 110 determines a change in the weight of the basket placing unit 3 from the output of the increase and decrease detection unit 112 (ACT 11), and when there is a change (increase and decrease) (Yes in ACT 11), the control unit 110 determines whether or not the commodity information is read from the output of the commodity information acquisition unit 111 within a predetermined time period before or after determining the change in the weight (ACT 12). When there is no reading (Yes in ACT 12), the movement state of the basket placing unit 3 is determined from the output of the movement detection unit 114 (ACT 13).

When the movement distance of the basket placing unit 3 reaches a predetermined value in ACT 13 (Yes in ACT 13), the control unit 110 selects the next processing depending on whether the change in the weight is an increase or a decrease (ACT 14). That is, when the weight increases in ACT 14 (Yes in ACT 14), the control unit 110 turns ON the non-registration flag (ACT 15). When the weight decreases in ACT 14 (Yes in ACT 14), the control unit 110 turns ON the non-deregistration flag (ACT 16).

After ACTS 15 and 16, the control unit 110 terminates the monitoring processing. When there is no change in the weight in ACT 11 (No in ACT 11), the commodity information is read in ACT 12 (No in ACT 12), and there is no movement in ACT 13 (No in ACT 13), the control unit 110 terminates the monitoring processing.

Figure 6:
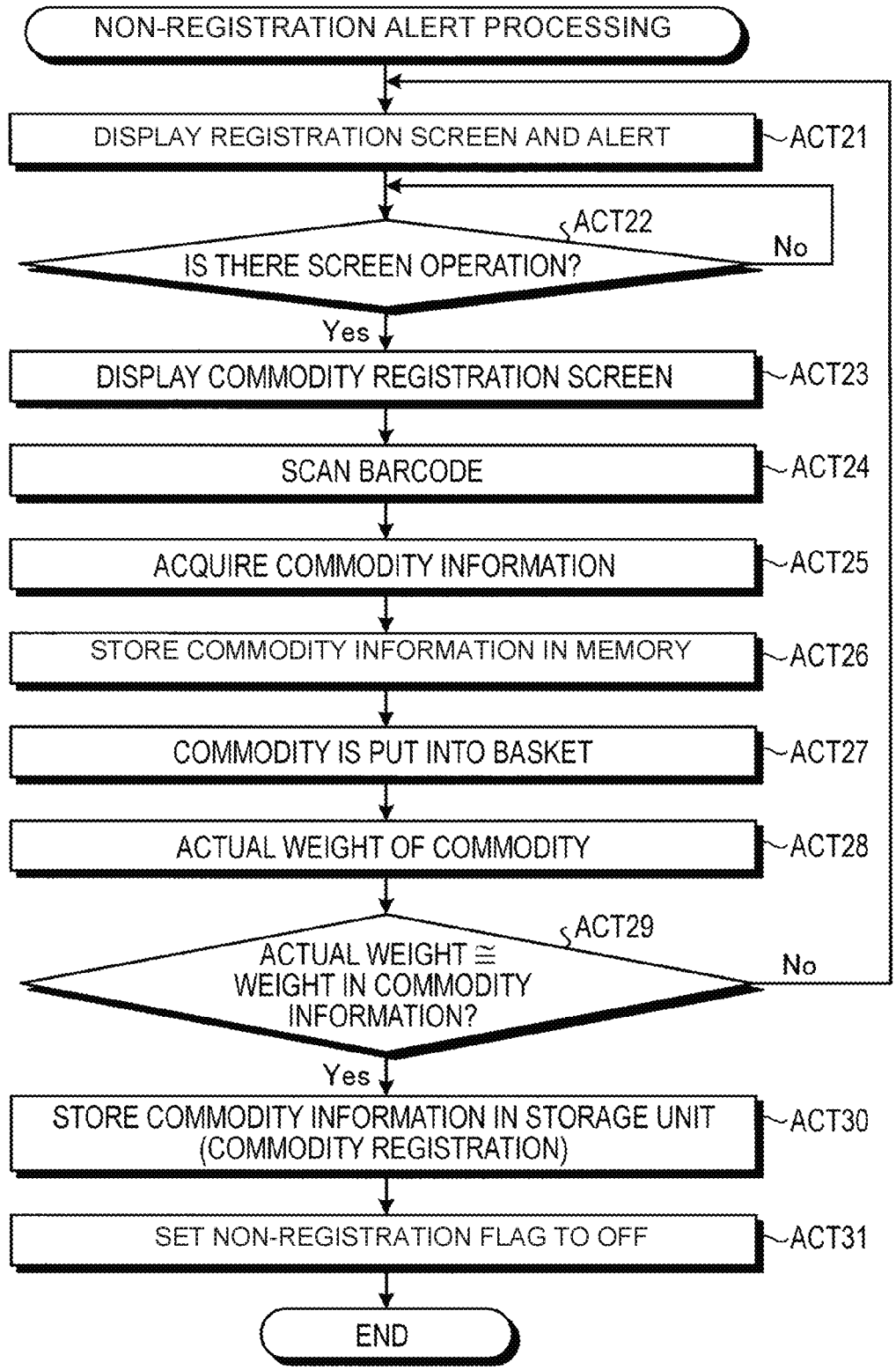
FIG. 6 is a flowchart schematically illustrating a flow of non-registration alert processing.

FIG. 6 is a flowchart schematically illustrating a flow of the non-registration alert processing (ACT 4). The control unit 110 first displays a registration screen and an alert on the display unit 12 (ACT 21), and waits for a screen operation (No in ACT 22).

FIG. 8A is a diagram illustrating an example of an alert displayed in the non-registration alert processing. For example, the alert is displayed as a pop-up window superimposed on the registration screen. A text of the alert is, for example, "COMMODITY NOT REGISTERED AS COMMODITY IS PUT INTO BASKET. PLEASE TAKE OUT CORRECT COMMODITY AND SCAN BARCODE." The pop-up window of the alert includes an "OK" object (e.g., button).

When a user who reads the text of the alert touches the "OK" object, the operation unit 13 receives the operation, after which the control unit 110 that receives a signal from the operation unit 13 determines that there is the screen operation in ACT 22 (Yes in ACT 22), closes the pop-up window of the alert, displays only the registration screen (ACT 23), and sets a state in which the commodity registration can be performed.

Next, the control unit 110 receives the scan of the barcode by a user operation (ACT 24), acquires the commodity information (ACT 25), and stores the commodity information in the memory (for example, RAM) (ACT 26). Next, the control unit 110 waits for the user to put the commodity into the basket K (ACT 27), and acquires an actual weight of the commodity put into the basket K based upon the output of the increase and decrease detection unit 112 (ACT 28).

Next, the control unit 110 determines whether the actual weight of the commodity matches the registered weight (reference value) included in the commodity information as the weight inquiry unit 113 (ACT 29). In ACT 29, when the actual weight matches the registered weight (reference value) included in the commodity information (Yes in ACT 29), the control unit 110 performs the commodity registration. That is, the commodity information held on the memory in ACT 24 is stored in the commodity information storage unit of the storage unit 120 (ACT 30). Next, the control unit 110 sets the non-registration flag to OFF (ACT 31), and terminates the processing.

Figure 7:
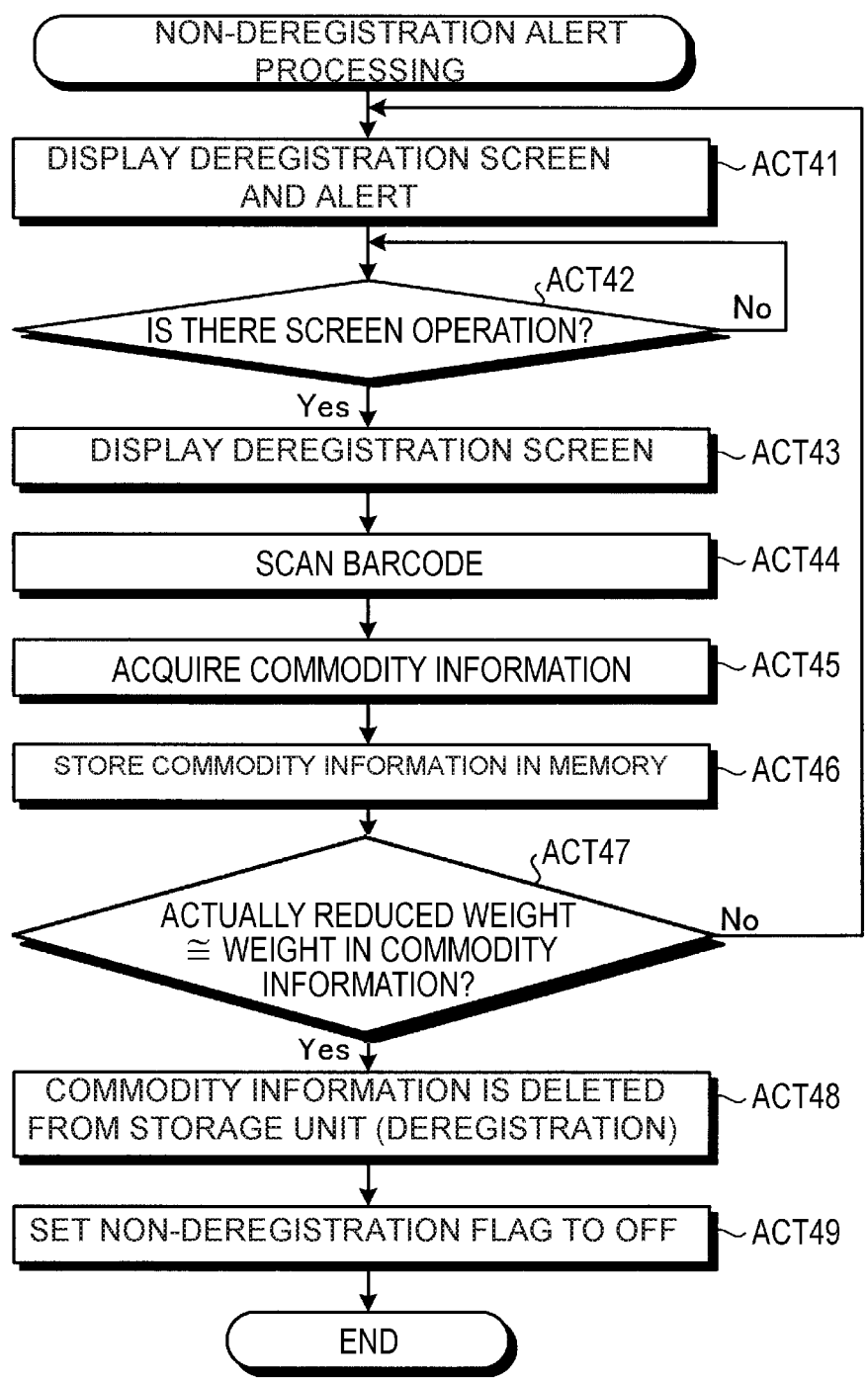
FIG. 7 is a flowchart schematically illustrating a flow of non-deregistration alert processing.

FIG. 7 is a flowchart schematically illustrating a flow of the non-deregistration alert processing (ACT 5). The control unit 110 first displays a deregistration screen and an alert on the display unit 12 (ACT 41), and waits for the screen operation (No in ACT 42).

FIG. 8B is a diagram illustrating an example of an alert in the non-deregistration alert processing. The alert is displayed, for example, as a pop-up window superimposed on the deregistration screen. A text of the alert is, for example, "RETURN REGISTRATION IS FORGOTTEN. PLEASE SCAN BARCODE OF COMMODITY TAKEN OUT.". The pop-up window of the alert includes an "OK" button.

When the user who reads the text of the alert touches the "OK" object, the operation unit 13 receives the operation, after which the control unit 110 that receives a signal from the operation unit 13 determines that there is the screen operation in ACT 42 (Yes in ACT 42), closes the pop-up window of the alert, displays only the deregistration screen (ACT 43), and sets a state in which the deregistration of the commodity can be performed.

Next, the control unit 110 receives the scan of the barcode by a user operation (ACT 44), acquires the commodity information (ACT 45), and stores the commodity information in the memory (for example, RAM) (ACT 46).

Next, the control unit 110 determines whether the actually reduced weight matches the registered weight (reference value) included in the commodity information as the weight inquiry unit 113 (ACT 47). In ACT 47, when the actually reduced weight matches the registered weight (reference value) included in the commodity information (Yes in ACT 47), the control unit 110 performs the deregistration. That is, the commodity information held on the memory in ACT 46 is deleted from the commodity information storage unit of the storage unit 120 (ACT 48). Next, the control unit 110 sets the non-registration flag to OFF (ACT 49), and terminates the processing.

As described above, according to the embodiment, in spite of a fact that the gross weight of the commodities in the commodity placement portion (basket placing unit 3) increases or decreases and thus it is presumed that the commodity is put into or taken out from the basket K, when the commodity code is not read by the scanner 5 and there is a possibility that the user may forget performing the registration (or deregistration) operation, it is possible to wait until it is considered almost certain that a commodity was not read, and to perform the alert notification appropriately by checking for the presence or absence of movement of the cart system 1 and a degree or amount thereof. Therefore, according to the embodiment, it is possible to notify a user of commodity non-registration at a proper timing when the commodity registration should be performed.

Accordingly, for example, when the user takes out a commodity in the basket K once for confirmation, and then returns the commodity to the basket K again, in a related art, an error is issued after a certain period of time elapses from the taking-out of the commodity, but according to the present embodiment, since the cart system 1 is still in a stopped state, it is possible to avoid bothering the user with an unnecessary error issuance.

According to the embodiment, for example, in a case where the commodity is large, when the user puts the commodity into the basket K prior to the scanning thereof and then reads the commodity by picking up the scanner 5, in a related art, an error would be issued after a certain period of time elapses from the putting-in of the commodity, but according to the present embodiment, since the cart system 1 is still considered to be in a stopped state, it is possible to avoid bothering the user with an unnecessary error issuance.

In the present embodiment, a tablet POS 10 installed on the cart system 1 is described as one example of an information processing apparatus, but the present disclosure is not limited thereto. For example, the information processing apparatus may be used together with a shopping basket, which is carried by the hand, as the commodity placement portion instead of the cart system 1. In this case, the weight sensor 7 can be installed at the bottom of the shopping basket itself. In such a case, the movement detection unit 114 would detect the movement of the shopping basket by a method different from that described in the example embodiment.

The movement detection unit 114 in the example embodiment detects movement by output of the rotation sensor 8 provided on at least one of the caster wheels 4, but the present disclosure is not limited thereto. For example, the movement detection unit 114 may detect the movement by receiving signals emitted by beacons disposed at a plurality of locations in the store, and then recognizing a change in the received beacon signal(s). The movement detection unit 114 may detect the movement by performing position detection using, for example, GPS. The movement detection unit 114 may detect the movement by detecting, for example, motion by image recognition of locations on the inside of the store. For example, the movement detection unit 114 may detect the movement of the commodity placement portion by detecting, for example, the movement of an RFID tag attached to a commodity.

The signal output by the movement detection unit 114 in the example embodiment is a signal by which the degree of movement can be determined and the movement distance can be calculated, but the implementation thereof is not limited thereto. In general, any signal can be used in this context as long as the signal can be utilized to determine the presence or absence of movement. The notification processing unit 115 in such a case can perform a notification based upon the output of the movement detection unit 114 once it is determined that the elapsed time from the start of the movement of the basket placing unit 3 reaches a predetermined value.

The notification processing unit 115 in the example embodiment performs both the notification to request the performance of the commodity registration (ACT 21 in FIG. 6 and FIG. 8A) and the notification to request the performance of the deregistration of the commodity (ACT 41 in FIG. 7 and FIG. 8B), but the implementation thereof is not limited thereto. In some examples, either one instead of both of the above-described notifications may be performed.

An example of application of the cart system 1 is described, but the implementation thereof is not limited thereto. For example, a handheld wireless device with a camera, such as a smartphone, is an example of the information processing apparatus, and such a device may be configured to wirelessly receive the output of a weight sensor that can be installed or placed in a basket carried by hand for use as the commodity placement portion.

In some examples, the PLU file may store a feature value data or a reference image of each possible commodity to permit the tablet POS 10 to identify the commodity being placed or removed from the basket by generic object recognition (object recognition). The feature value data is data such as a color of the commodity and a surface roughness of a surface of the commodity, which can be read from the reference image of the commodity.

In this case, instead of or in addition to the scanner 5, a reading apparatus including an imaging device such as a charge coupled device (CCD) can be used, and information on the commodity is obtained from an image (captured image) captured by the imaging device. More specifically, the reading apparatus can output code information obtained by reading (decoding) a code symbol such as a barcode or a two-dimensional code attached to the surface of the commodity, and/or an image (captured image) obtained of the commodity to the tablet POS 10.

In this case, the commodity information acquisition unit 111 extracts the commodity information of the commodity that coincides with the acquired code information and/or the captured image from the PLU file. More specifically, when the acquired information is the code information, the commodity information acquisition unit 111 searches the PLU file for the commodity code that coincides with the code information, and acquires the commodity information associated with the commodity code. When the acquired information is the captured image without a commodity code, the commodity information acquisition unit 111 acquires the feature value data by performing generic object recognition (object recognition) based upon the captured image, and then acquires the commodity information of the commodity that coincides with the reference feature value data from the PLU file. The above-described commodity code recognition and feature value data recognition are examples of different methods capable of recognizing the commodity.

With respect to the generic object recognition for recognizing an object included in the image, for example, a possible recognition technique is described in the following document:

Keiji Yanai, "Current State and Future of Generic Object Recognition", Transactions of Information Processing Society of Japan, Vol. 48, No. SIG16 [Search on Jan. 5, 2018], Internet <URL: http://mm.cs.uec.ac.jp/IPSJ-TCVIM-Yanai.pdf>

The increase and decrease detection unit 112 in the embodiment is described as the unit outputting the signal corresponding to the increase and decrease in the weight of the commodity (or commodities) held by the commodity placement portion (basket placing unit 3), but the implementation thereof is not limited thereto. For example, the increase and decrease detection unit 112 may output a signal indicating the increase and decrease in the number of commodities based upon a change in images of the commodity placement portion captured by the information processing apparatus (tablet POS 10).

In the embodiment, the tablet terminal and the smartphone are described as examples of the information processing apparatus, but the implementation thereof is not limited thereto. For example, a system for linking the tablet terminal with a server on the Internet may be configured to serve as the respective units provided in the information processing apparatus.

The program executed by the information processing apparatus of an embodiment is provided by being incorporated in the ROM in advance.

The program executed by the information processing apparatus of an embodiment may be provided in a form of an installable or executable file and by being recorded on a non-transitory computer-readable recording medium such as a CD-ROM, a flexible disk (FD), a CD-R, and a digital versatile disk (DVD).

The program executed by the information processing apparatus of an embodiment may be configured to be stored in a computer connected to a network such as the Internet, and to be provided by being downloaded via the network. The program executed by the information processing apparatus of an embodiment may be configured to be provided or distributed via a network such as the Internet.

The program executed by the information processing apparatus of an embodiment has a module configuration including the above-described respective units (e.g., commodity information acquisition unit 111, increase and decrease detection unit 112, weight inquiry unit 113, movement detection unit 114, and notification processing unit 115). The CPU (processor) reads the program from the storage medium and executes the program, thereby loading the respective units on the main storage apparatus. Accordingly, the commodity information acquisition unit 111, the increase and decrease detection unit 112, the weight inquiry unit 113, the movement detection unit 114, and the notification processing unit 115 are realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
    a cart body having a commodity placement portion and a wheel;
    a weight sensor configured to detect a weight of commodities in the commodity placement portion;
    a movement sensor configured to detect movement of the cart body;
    a code scanner configured to read a commodity code;
    a display; and
    a control circuit configured to:
       determine change in the weight detected by the weight sensor;
       upon determining the change of the weight, determine whether the code scanner has read a commodity code within a predetermined time period before or after the change of the weight;
       upon determining that the code scanner has not read a commodity code within the predetermined time period, determine whether a movement of the cart body, as detected by the movement sensor, satisfies a predetermined condition; and
       upon determining that the movement of the cart body satisfies the predetermined condition, control the display to display a registration alert screen.

2. The information processing apparatus according to claim 1, wherein the registration alert screen indicates a non-registration of a commodity when an increase in weight was detected by the weight sensor and a deregistration of a commodity when a decrease in weight was detected by the weight sensor.

3. The information processing apparatus according to claim 2, wherein the control circuit is further configured to:
    obtain a registered weight of a commodity identified by a commodity code read by the code scanner after the registration alert screen is displayed; and
    perform registration of the commodity identified by the commodity code when an increased amount of the weight detected by the weight sensor matches the registered weight.

4. The information processing apparatus according to claim 2, wherein the control circuit is further configured to:
    obtain a registered weight of a commodity identified by a commodity code read by the code scanner after the registration alert screen is displayed; and
    perform deregistration of the commodity identified by the commodity code when a decreased amount of the weight detected by the weight sensor matches the registered weight.

5. The information processing apparatus according to claim 1, wherein the predetermined condition includes that the movement of the card body detected by the movement sensor is greater than a predetermined movement amount.

6. The information processing apparatus according to claim 1, wherein the predetermined condition includes that a time period from start of movement of the card body as detected by the movement sensor is greater than a predetermined time period.

7. The information processing apparatus according to claim 1, wherein the movement sensor is configured to detect movement of the wheel.

8. The information processing apparatus according to claim 1, wherein the display and the control circuit are included in a terminal device attached to the cart body and communicably connected to the weight sensor, the movement sensor, and the code scanner.

9. The information processing apparatus according to claim 1, wherein the display and the control circuit are in a handheld wireless device, and the handheld wireless device is wirelessly connected to the weight sensor, the movement sensor, and the code scanner.

10. A shopping cart system, comprising:
    a cart body having a commodity placement portion and a wheel;
    an image sensor configured to detect placement of a commodity in, and removal from, the commodity placement portion;
    a movement sensor configured to detect movement of the cart body;
    a code scanner configured to read a commodity code;
    a display; and
    a control circuit configured to:
       upon detection by the image sensor of placement or removal of a commodity from the commodity placement portion, determine whether the code scanner has read a commodity code within a predetermined time period before or after the detection of placement or removal;
       upon determining that the code scanner has not read a commodity code, determine whether a movement of the cart body, as detected by the movement sensor, satisfies a predetermined condition; and upon determining that that the movement of the cart body satisfies the predetermined condition, control the display to display a registration alert screen.

11. The shopping cart system according to claim 10, wherein the registration alert screen indicates non-registration of a commodity when placement of a commodity was detected and non-deregistration of a commodity when removal of a commodity was detected.

12. A method for performing commodity registration, comprising:
   detecting a change in a weight detected by a weight sensor positioned to detect a weight of commodities in a commodity placement portion of a shopping basket;
   upon detecting the change in the weight, determining whether a code scanner has read a commodity code within a predetermined time period before or after the change in the weight;
   upon determining that the code scanner has not read a commodity code within the predetermined time period, determining whether a movement of the shopping basket, as detected by a movement sensor, satisfies a predetermined condition; and
   upon determining that the movement of the shopping basket satisfies the predetermined condition, controlling a display to display a registration alert screen.

13. The method according to claim 12, wherein the registration alert screen indicates non-registration of a commodity when the weight is increased and indicates deregistration of a commodity when the weight is decreased.

14. The method according to claim 13, further comprising:
   obtaining a registered weight of a commodity identified by a commodity code that is read by the code scanner after the registration alert screen is displayed; and
   performing registration of the commodity identified by the commodity code when an increased weight detected by the weight sensor matches the registered weight.

15. The method according to claim 13, further comprising:
   obtaining a registered weight of a commodity identified by a commodity code that is read by the code scanner after the registration alert screen is displayed; and
   performing deregistration of the commodity identified by the commodity code when a decreased weight detected by the weight sensor matches the registered weight.

16. The method according to claim 12, wherein the predetermined condition includes that the movement is greater than a predetermined movement amount.

17. The method according to claim 12, wherein the predetermined condition includes that a time period from start of the movement is greater than a predetermined time period.

18. The method according to claim 12, wherein the movement is detected based on movement of a wheel attached to the shopping basket.

19. The method according to claim 12, wherein a tablet terminal device is attached to the shopping basket and communicably connected to the weight sensor, the movement sensor, and the code scanner.

20. The method according to claim 12, wherein the display is on a handheld wireless device carried by a user of the shopping basket, and the handheld wireless device is wirelessly connected to the weight sensor, the movement sensor, and the code scanner.

* * * * *

UNITED STATES PATENT AND TRADEMARK OFFICE
CERTIFICATE OF CORRECTION

PATENT NO.       : 11,295,287 B2
APPLICATION NO.  : 16/893897
DATED            : April 5, 2022
INVENTOR(S)      : Shuhei Nagamori It is certified that error appears in the above-identified patent and that said Letters Patent is hereby corrected as shown below:

In the Claims

In Column 11, Claim 10, Line 1, please delete second instance of "that".

Signed and Sealed this
Fifteenth Day of November, 2022

Katherine Kelly Vidal
*Director of the United States Patent and Trademark Office*